United States Patent
Cho et al.

(10) Patent No.: US 10,191,203 B2
(45) Date of Patent: Jan. 29, 2019

(54) STACKING-TYPE OPTICAL SHEET MODULE

(71) Applicant: LMS CO., LTD, Pyeongtaek-si, Gyeonggi-do (KR)

(72) Inventors: Sung Sik Cho, Suwon-si (KR); Dong Cheol Lee, Suwon-si (KR); Tae Jun Lee, Osan-si (KR); Hee Jeong Kim, Osan-si (KR)

(73) Assignee: LMS CO., LTD, Pyeongtaek-si, Gyeonggi-do (KR)

( * ) Notice: Subject to any disclaimer, the term of this patent is extended or adjusted under 35 U.S.C. 154(b) by 90 days.

(21) Appl. No.: 15/110,445

(22) PCT Filed: Jan. 6, 2015

(86) PCT No.: PCT/KR2015/000119
§ 371 (c)(1),
(2) Date: Jul. 8, 2016

(87) PCT Pub. No.: WO2015/105318
PCT Pub. Date: Jul. 16, 2015

(65) Prior Publication Data
US 2016/0341882 A1    Nov. 24, 2016

(30) Foreign Application Priority Data
Jan. 10, 2014  (KR) .................. 10-2014-0003554

(51) Int. Cl.
*F21V 8/00*    (2006.01)
*G02B 5/02*    (2006.01)

(52) U.S. Cl.
CPC ............ *G02B 6/0053* (2013.01); *G02B 5/02* (2013.01); *G02B 5/0231* (2013.01);
(Continued)

(58) Field of Classification Search
USPC ........................................................ 362/607
See application file for complete search history.

(56) References Cited

U.S. PATENT DOCUMENTS 7,796,213 B2 * 9/2010 Shiraishi .............. G02B 6/0038
349/65
8,075,151 B2 * 12/2011 Ito ..................... G02F 1/133606
362/235
(Continued)

FOREIGN PATENT DOCUMENTS

JP    2003511726 A    3/2003
JP    2008536176 A    9/2008
(Continued)

OTHER PUBLICATIONS

Int'l Search Report dated May 11, 2015 in Int'l Application No. PCT/KR2015/000119.

*Primary Examiner* — Michael G Lee
*Assistant Examiner* — David Tardif
(74) *Attorney, Agent, or Firm* — Novick, Kim & Lee, PLLC; Jae Youn Kim

(57) ABSTRACT

A stacking-type optical sheet module includes an upper optical sheet having a first structural pattern with first unit light-condensing bodies successively repeated and cross-sectional areas gradually decreasing towards the top. A lower optical sheet has a second structural pattern and is below the upper optical sheet in a stack. Second and third unit light-condensing bodies are successively disposed in the second structural pattern. The second unit bodies have a gradually decreasing cross-sectional area toward the top and are joined with the upper optical sheet, and the third unit bodies have a gradually decreasing cross-sectional area toward the top, a vertical distance from a lowest to a highest portion thereof being relatively shorter than a corresponding vertical distance of the second unit bodies. A vertical angle of the highest portion of the second unit bodies is relatively smaller than a vertical angle of the highest portion of the third unit bodies.

33 Claims, 15 Drawing Sheets

(52) U.S. Cl.
CPC .......... *G02B 6/0011* (2013.01); *G02B 6/0056* (2013.01); *G02B 6/0058* (2013.01); *G02B 6/0065* (2013.01)

(56) References Cited

U.S. PATENT DOCUMENTS

| | | | | |
|---|---|---|---|---|
| 8,506,149 | B2* | 8/2013 | Kim | G02B 5/045 362/330 |
| 8,619,363 | B1* | 12/2013 | Coleman | G02B 5/18 359/576 |
| 8,807,817 | B2* | 8/2014 | Yang | G02B 6/0076 362/606 |
| 2007/0008738 | A1* | 1/2007 | Han | G02B 5/045 362/607 |
| 2007/0223247 | A1* | 9/2007 | Lee | G02B 5/045 362/606 |
| 2014/0043850 | A1* | 2/2014 | Thompson | G02B 6/0035 362/607 |

FOREIGN PATENT DOCUMENTS

| | | | |
|---|---|---|---|
| KR | 20090047485 | A | 5/2009 |
| KR | 20130097580 | A | 9/2013 |

* cited by examiner (a)

$A_2 + 2\alpha = A_3$ (b)

$A_3 + 2\alpha > A_3$ (a)

$A_2 + 2\alpha = A_3$ (b)

STACKING-TYPE OPTICAL SHEET MODULE

CROSS-REFERENCE TO RELATED APPLICATION

This application is a section 371 of International Application No. PCT/KR2015/000119, filed Jan. 6, 2015, which was published in the Korean language on Jul. 16, 2015, under International Publication No. WO 2015/105318 A1, and the disclosure of which is incorporated herein by reference.

TECHNICAL FIELD

The present invention relates to an optical sheet module, more particularly, to a stacking-type optical sheet module in which vertical angles of unit light condensing bodies joined in consideration of a region joined when joined with an upper optical sheet in a lower optical sheet are differently formed.

BACKGROUND ART

The liquid crystal display device is a display device that is used for a notebook computer, a personal computer, a smart phone, a TV and the like, and its characteristics are also improved every year according to an expansion of demand for the liquid crystal display device.

A liquid crystal panel of a liquid crystal display device as a non-light-emitting element structurally requires a backlight unit. The backlight unit is made up of variety of optical systems. Further, the backlight unit uses an optical film of periodic arrangement in order to improve brightness.

FIG. 1 is a diagram schematically illustrating a configuration of a conventionally developed liquid crystal display device.

As illustrated in FIG. 1, the backlight unit 10 includes a light-emitting source 1, a reflector 2, a light guide plate 3, a diffusion sheet 4, a first optical sheet 5 and a second optical sheet 6.

The light-emitting source 1 is an element that generates visible ray, and a light-emitting diode (LED) and a cold cathode fluorescent lamp (CCFL) can be selectively used as such a light-emitting source 1.

Light emitted from the light-emitting source 1 is incident on the light guide plate 3 and proceeds inside the light guide plate 3 while generating the total reflection, and since light which is incident on the inner surface of the light guide plate 3 at an incidence angle smaller than an critical angle is transmitted without being totally reflected, the light is emitted to the top and the bottom.

At this time, the reflector 2 improves the light efficiency by reflecting the light emitted to the bottom and causing the light to enter the light guide plate 3 again.

The diffusion sheet 4 diffuses the light emitted through the top surface of the light guide plate 3 to make brightness uniform and broaden the viewing angle, but the light which has passed through the diffusion sheet 4 is degraded in front exit brightness.

The first optical sheet 5 is made up of a base portion 5b and a structural pattern 5a, and emits the light incident from the diffusion sheet 4 by refracting and primarily condensing the light so as to be vertically incident.

Further, the structural pattern 5a is formed integrally with the top surface of the base portion 5b and is made up of a structure for vertically refracting and emitting the light incident through base portion 5b.

The structural pattern 5a is generally formed to have a triangular cross section, and the vertical angle of the triangular shape is usually substantially 90 degrees.

Moreover, the second optical sheet 6 has the same shape as the first optical sheet 5, and secondarily condenses and releases the light to enhance the brightness of the light that is primarily condensed in the first optical sheet 5.

Here, the first optical sheet 5 and the second optical sheet 6 are disposed and integrally joined together so that an extension direction of the structural pattern of the first optical sheet 5 and an extension direction of the structural pattern of the second optical sheet 6 intersect with each other at a right angle in order to further enhance the brightness.

However, such a configuration have a problem in which, when joining the first optical sheet 5 and the second optical sheet 6, the shape of the structural pattern 5a is deformed while an upper end portion thereof being joined to the bottom surface of the second optical sheet 6, the length of the cross-section trace changes, or a vertical angle or a inclined angle of an inclined surface changes, and thus, the direction of refraction of light transferred from the lower part is not actually uniform.

In this way, there is a problem in which when the direction of refracting and condensing the light in the structural pattern 5a becomes uneven, the brightness is degraded, and the quality of the backlight unit is degraded accordingly.

DISCLOSURE

Technical Problem

An aspect of the present invention provides a stacking-type optical sheet module that is capable of maintaining an optimum inclined angle and vertical angle of the inclined surface to reduce a decrease in light condensing effect, because the shape of the unit condensing body formed in the lower optical sheet changes when joined to the upper optical sheet, and the inclined angle and vertical angle of the inclined surface for refracting the light changes.

Technical Solution

According to an aspect of the present invention, there is provided a stacking-type optical sheet module that includes an upper optical sheet having a first structural pattern in which first unit light-condensing bodies are successively repeated, cross-sectional areas of the first unit light-condensing bodies gradually decreasing towards the top; and a lower optical sheet which has a second structural pattern and is disposed below the upper optical sheet in a stacked form, second unit light-condensing bodies and third unit light-condensing bodies being combined and successively disposed in the second structural pattern, the second unit light-condensing bodies having a gradually decreasing cross-sectional area toward the top and being joined with the upper optical sheet, and the third unit light-condensing bodies having a gradually decreasing cross-sectional area toward the top, a vertical distance from a lowest portion to an highest portion thereof being formed relatively shorter than a vertical distance from a lowest portion to an highest portion of the second unit light-condensing bodies, wherein a vertical angle of the highest portion of the second unit light-condensing bodies is relatively smaller than a vertical angle of the highest portion of the third unit light-condensing bodies.

Further, the second structural pattern may be at least partially directly joined to the bottom surface of the upper optical sheet.

Further, upper end portions of the second unit light-condensing bodies are joined to the bottom surface of the upper optical sheet and are deformed in the joining process, and the vertical angle of second unit light-condensing bodies increases to get closer to the vertical angle of the third unit light-condensing bodies.

Further, the upper end portions of the second unit light-condensing bodies are joined to the bottom surface of the upper optical sheet, and the shape of the cross-sectional trace is deformed by the pressure in the joining process.

Further, the stacking-type optical sheet module further include an adhesive layer which is formed between the upper optical sheet and the lower optical sheet and into which upper end portion of the second structural pattern is embedded.

Further, the upper end portions of the second unit light-condensing bodies are embedded and joined into the interior of the adhesive layer and are deformed by the pressure in the joining process, and the vertical angle of the second unit light-condensing bodies increases to get closer to the vertical angle of the third unit light-condensing bodies.

Further, the upper end portions of the second unit light-condensing bodies are embedded and joined to the interior of the adhesive layer, and the shape of the cross-section locus is deformed in the joining process.

Further, the adhesive layer has an uneven thickness, and the upper end portions of the second unit light-condensing bodies may be only partially embedded in the adhesive layer.

A plurality of third unit light-condensing bodies may be provided, and the vertical distance from the lowest portion to the highest portion may be formed unevenly.

A plurality of third unit light-condensing bodies may be provided and may have cross-sections of sizes and shapes different from each other.

The length of the trace of the cross-section of at least some of the plurality of third unit light-condensing bodies may be formed asymmetrically.

The third unit light-condensing bodies may have a vertical angle of the same angle as the first unit light-condensing bodies.

Further, the trace of the cross-section of at least one of the first unit light-condensing bodies to the third unit light-condensing bodies may be made up of a straight line.

The vertical angle of the third unit light-condensing bodies may have an optimum value that can exhibit optimum optical characteristics corresponding to the material.

The shapes of the cross sections of the first unit light-condensing bodies to the third unit light-condensing bodies may be a triangular shape.

Further, the stacking-type optical sheet module may further include a reflective polarizing film which is disposed with the lower optical sheet and the upper optical sheet in the stacked form to selectively transmit the light depending on the polarization of light transferred from the lower part.

Furthermore, the reflective polarizing film may be provided by being stacked between the upper optical sheet and the lower optical sheet.

Furthermore, the reflective polarizing film may be provided by being stacked on the top of the upper optical sheet.

The first structural pattern may change in height along the extension direction.

Also, the upper optical sheet and the lower optical sheet may be disposed so that the extension direction of the first structural pattern and the extension direction of the second structural pattern intersect with each other.

Further, the extension direction of the first structural pattern and the extension direction of the second structural pattern may perpendicularly intersect with each other.

According to another aspect of the present invention, there is provided a stacking-type optical sheet module that includes an upper optical sheet having a first structural pattern in which first unit light-condensing bodies are successively repeated, cross-sectional areas of the first unit light-condensing bodies gradually decreasing toward the top; and a lower optical sheet which has a second structural pattern and is disposed below the upper optical sheet in a stacked form, second unit light-condensing bodies and third unit light-condensing bodies being combined and successively disposed in the second structural pattern, the second unit light-condensing bodies being formed with an inclined surface having a gradually decreasing cross-sectional area toward the top and being joined with the upper optical sheet, and the third unit light-condensing bodies being formed with an inclined surface having a gradually decreasing cross-sectional area toward the top, a vertical distance from a lowest portion to an highest portion thereof being formed relatively shorter than a vertical distance from a lowest portion to an highest portion of the second unit light-condensing bodies, wherein a inclined angle of the inclined surface of the second unit light-condensing bodies is formed relatively larger than a inclined angle of the inclined surface of the third unit light-condensing bodies.

Further, the second structural pattern may be at least partially directly joined to the bottom surface of the upper optical sheet.

Further, upper end portions of the second unit light-condensing bodies are joined to the bottom surface of the upper optical sheet and are deformed in the joining process, and the inclined angle of the inclined surface of the second unit light-condensing bodies changes.

Further, the upper end portions of the second unit light-condensing bodies are joined to the bottom surface of the upper optical sheet, and the shape of the cross-sectional trace is deformed by the pressure in the joining process.

Further, the stacking-type optical sheet module may further include an adhesive layer which is formed between the upper optical sheet and the lower optical sheet and into which upper end portion of the second structural pattern is embedded.

Further, the upper end portions of the second unit light-condensing bodies are embedded and joined into the interior of the adhesive layer and are deformed by the pressure in the joining process, and the inclined angle of the second unit light-condensing bodies changes.

Further, the upper end portions of the second unit light-condensing bodies are embedded and joined to the interior of the adhesive layer, and the shape of the cross-section locus is deformed in the joining process.

Further, the adhesive layer has an uneven thickness, and the upper end portions of the second unit light-condensing bodies may be only partially embedded in the adhesive layer.

A plurality of third unit light-condensing bodies may be provided, and the vertical distance from the lowest portion to the highest portion may be formed unevenly.

A plurality of third unit light-condensing bodies may be provided and may have cross-sections of sizes and shapes different from each other.

The length of the trace of the cross-section of at least some of the plurality of third unit light-condensing bodies may be formed asymmetrically.

The third unit light-condensing bodies may have a vertical angle of the same angle as the first unit light-condensing bodies.

Further, the trace of the cross-section of at least one of the first unit light-condensing bodies to the third unit light-condensing bodies may be made up of a straight line.

The inclined angle of the inclined surface of the third unit light-condensing bodies may have an optimum value that can exhibit optimum optical characteristics corresponding to the material.

Advantageous Effects

According to the present invention for solving the above problems, there are following effects.

First, in the optical sheet module in which the upper optical sheet formed with the first structural pattern and the lower optical sheet formed with the second structural pattern are joined in the stacked form, an increase in second vertical angle and a variation of the inclined angle of the inclined surface occur in the second unit light-collecting bodies formed below the lower optical sheet. Thus, by molding the second unit light-condensing bodies to correspond to the inclined angle of the inclined surface and the third vertical angle of the third unit light-condensing bodies in consideration of the deformation due to joining during molding, there is an effect in which the second structural pattern can maintain the optimum inclined angle of the inclined surface, after joining of the upper optical sheet and the lower optical sheet.

Second, there is an advantage capable of enhancing the joining strength by providing a separate adhesive layer between the upper optical sheet and the lower optical sheet to increase the joining area.

Third, because the plurality of third unit light-condensing bodies is provided and the distance from the lowest portion to the highest portion is unevenly formed, there is an advantage that can prevent a wet-out phenomenon.

The effects of the present invention are not limited to the aforementioned effects, and other effects that have not been mentioned will be clearly understood by those skilled in the art from the scope of the claims.

BEST MODE

Figure 1:
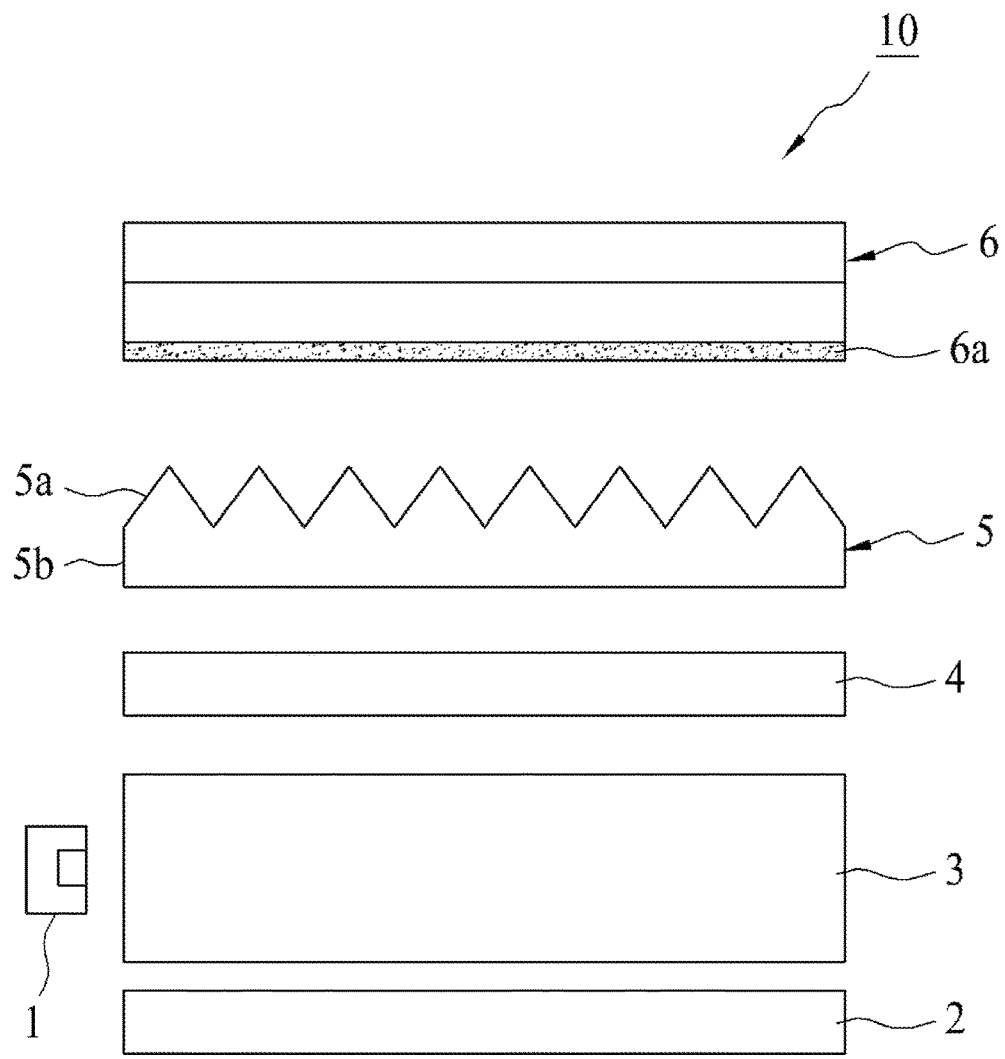
FIG. 1 is a diagram schematically illustrating a configuration of a conventionally developed liquid crystal display device.

Hereinafter, embodiments of the invention will be described in detail with reference to the accompanying drawings. The drawings are attached hereto to help explain exemplary embodiments of the invention, and the present invention is not limited to the drawings and embodiments. In the drawings, some elements may be exaggerated, reduced in size, or omitted for clarity or conciseness.

A preferred embodiment of the stacking-type optical sheet module having the aforementioned configuration according to the present invention will be described through the accompanying drawings. However, this is not intended to assist clearer understanding through an embodiment of the present invention rather than limiting the invention to the particular form.

Further, in describing the embodiments of the present invention, the same components will be denoted by the same names and the same reference numerals, and the additional description thereof will not be provided.

The stacking-type optical sheet module according to the embodiment of the present invention can be applied to various fields for changing the path of light, and in the embodiment of the present invention, the form applied to a liquid crystal display device will be described as an example.

First, a schematic configuration of a liquid crystal display device according to an embodiment of the present invention will be described referring to FIGS. 2 and 3.

Figure 2:
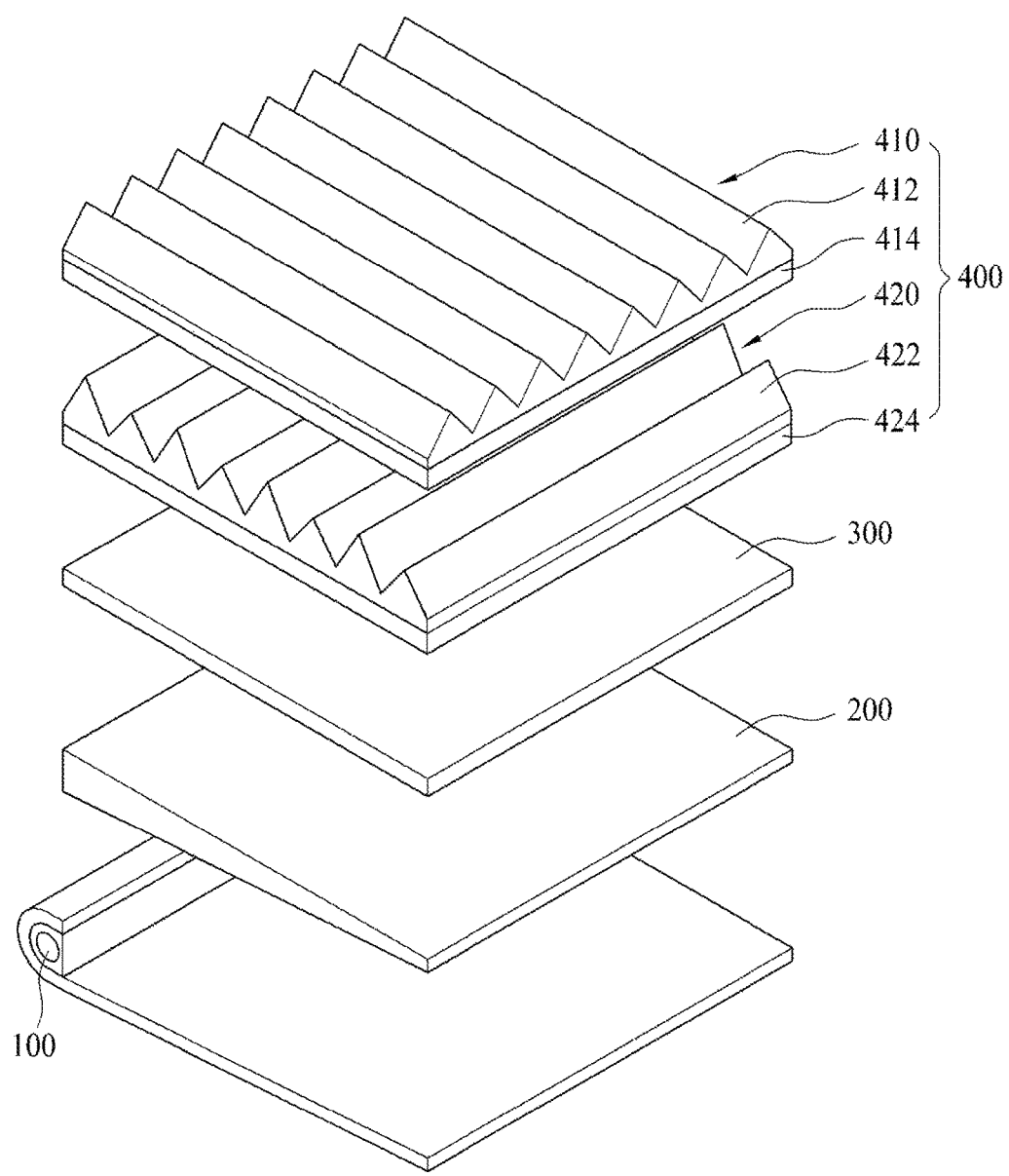
FIG. 2 is a diagram schematically illustrating the configuration of the optical sheet module according to the embodiment of the invention.
Figure 3:
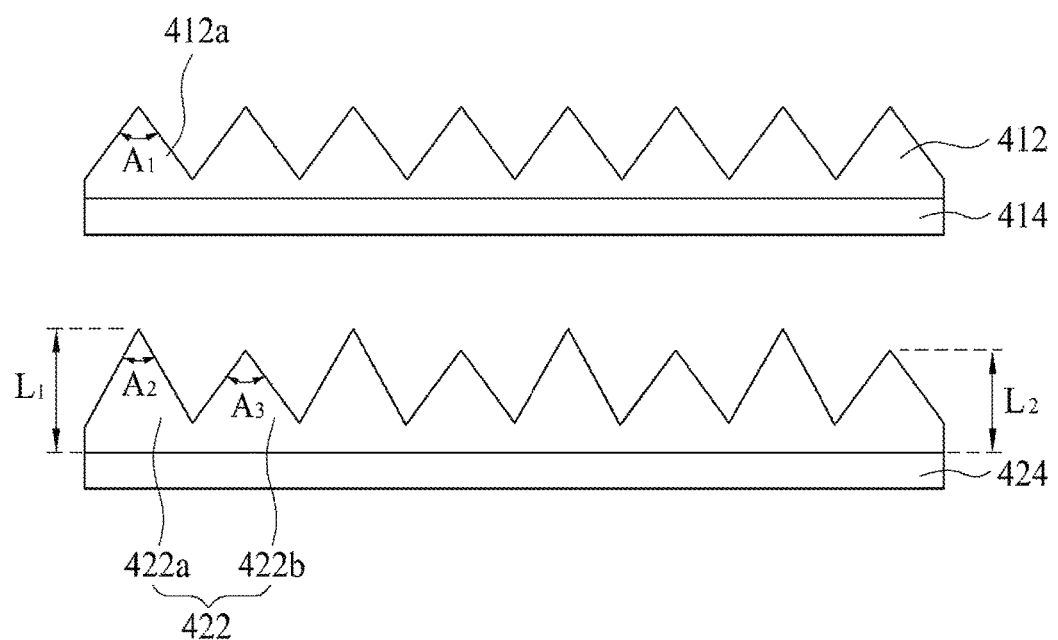
FIG. 3 is a diagram illustrating shapes of a first structural pattern and a second structural pattern in the optical sheet module of FIG. 2.

FIG. 2 is a diagram schematically illustrating the configuration of an optical sheet module according to an embodiment of the present invention, and FIG. 3 is a diagram illustrating shapes of the first structural pattern and the second structural pattern in the optical sheet module of FIG. 2.

As illustrated, in configuring the liquid crystal display device, it is necessary to essentially include a backlight unit (BLU) that provides light to the liquid crystal panel. Such a backlight unit broadly includes a light source 100, a light guide plate 200, a diffusion sheet 300 and an optical sheet module 400.

The light source 100 is generally made up of a light emitter which emits light, and is located on the side portion of the light guide plate 200. The light emitted from the light source 100 is incident on the light guide plate 200.

Further, the light guide plate 200 reflects and scatters the light incident from the light source 100 and transmits the light in the direction of the diffusion sheet 300. The diffusion sheet 300 is disposed above the light guide plate 200, and diffuses and uniformly spreads the light transferred from the light guide plate 200 to transmit the light to the upper part.

Further, the optical sheet module 400 is disposed over the light guide plate 200 to condense the light transferred from the diffusion sheet 300 and move the light to the upper part. The optical sheet module 400 is generally made up of a pair of an upper optical sheet 410 and a lower optical sheet 420.

Light is condensed in a direction perpendicular to the surface of the optical sheet module 400 by the structural patterns formed on the upper optical sheet 410 and the lower optical sheet 420 thus configured.

The optical sheet module 400 will be described in more detail. The optical sheet module 400 includes the upper optical sheet 410 and the lower optical sheet 420.

The upper optical sheet 410 is broadly made up of a first base film 414 and a first structural pattern 412.

A light transmissive film is generally used as the first base film 414 to allow the light incident from the lower part to readily pass through the first base film. On the top surface of the first base film 414, the first structural pattern 412 that refracts and condenses the incident light is formed integrally with the first base film 414.

The first structural pattern 412 is made up of a plurality of first unit light-condensing bodies 412a which are continuously repeated on the top surface of the first base the film 414, and are formed with inclined surfaces protruding in an upward direction and having a gradually decreasing cross-sectional area toward the upper part.

The first unit light-condensing bodies 412a refract and condense light transmitted through the first base film 414 and transfer the light to the upper part.

In general, the first structural pattern 412 includes a plurality of prisms so that triangular upper and lower cross sections are formed to extend along one direction. The lower optical sheet 420 according to an embodiment of the present invention is broadly made up of the second base film 424 and the second structural pattern 422 and is disposed below the upper optical sheet 410, and the second structural pattern 422 is formed on the top surface of the second base film 424.

Similarly to the first base film 414, the second base film 424 transmits the light transferred from the diffusion sheet 300 disposed at the bottom and transfer the light to the top, and the second structural pattern 422 is formed on the top surface.

Similarly to the first structural pattern 412, the second structural pattern 422 is formed such that the cross-sectional area becomes smaller toward the top, and refracts and condenses the light transferred from the diffusion sheet 300 and transferred the light to the upper part.

The second structural pattern 422 has an inclined surface on the top surface of the second base film 424, is formed such that the cross-sectional area becomes smaller in the upward direction, and is formed such that a plurality of second unit light-condensing bodies 422a and third unit light-condensing bodies 422b are combined and continuously repeated.

Specifically, the second unit light-condensing bodies 422a have a configuration which has a gradually decreasing cross-sectional area toward the top, and allows the upper optical sheet 410 and the lower optical sheet 420 to be joined to each other. The second unit light-condensing bodies 422a have at least a pair of inclined surfaces, refract and condense the light incident from the lower part, and have a second vertical angle $A_2$ of a predetermined angle in the highest portion.

Here, the second vertical angle $A_2$ means the angle of the apex of the second unit light-condensing bodies 422a having the triangular upper and lower cross-sections.

The third unit light-condensing bodies 422b are formed similarly to the above-mentioned second unit light-condensing bodies 422a, similarly have at least a pair of inclined surfaces, refract and condense the light incident from the lower part and deliver the light to the upper part. Here, similarly to the second unit light-condensing bodies 422a, the third unit light-condensing bodies 422b also have the gradually decreasing cross-sectional area toward the top, and have a third vertical angle $A_3$ on the highest portion.

At this time, similarly to the aforementioned second vertical angle $A_2$, the third vertical angle $A_3$ means the angle of the apex of the third unit light-condensing bodies 422b having the triangular upper and lower cross-sections.

Further, each of the second unit light-condensing bodies 422a and the third unit light-condensing bodies 422b is formed to have the inclined surface, and the inclined surface provided in each of the light-condensing bodies is formed to include upward at a constant inclined angle.

Further, each of the inclined surfaces formed on the second unit light-condensing bodies 422a and the third unit light-condensing bodies 422b extends in the state of having the inclined angle, and is formed so that the upper end portions meet each other.

Thus, in the second unit light-condensing bodies 422a and the third unit light-condensing bodies 422b, the upper and lower cross-sectional shapes cut in the vertical direction form a triangular shape, and the angles of the two vertexes of the bottom in the triangular upper and lower cross sections angle mean the inclined angles of the inclined surfaces provided in the second unit light-condensing bodies 422a and the third unit light-condensing bodies 422b.

Meanwhile, a vertical distance L2 from the lowest portion to the highest portion the third unit light-condensing bodies 422b is formed relatively shorter than a vertical distance L1 from the lowest portion to the highest portion of the second unit light-condensing bodies 422a.

Thus, when joining the upper optical sheet 410 and the lower optical sheet 420 in the stacked form, the third unit light-condensing bodies 422b are configured so as not to be joined to the upper optical sheet 410.

As illustrated in this embodiment, when joining the upper optical sheet 410 and the lower optical sheet 420, the second unit light-condensing bodies 422a are directly joined with the bottom surface of the first base film 412. Specific binding process will be described later with reference to FIG. 4.

In this way, in this embodiment, because the distance from the lowest portion to the highest portion of the second unit light-condensing bodies 422a is formed relatively larger than the third unit light-condensing bodies 422b, the inclined angle of the inclined surface formed in the third unit light-condensing bodies 422b is formed smaller than the inclined angle of the inclined surface formed in the second unit light-condensing bodies extend upward to form a second vertical angle A2 and a third vertical angle A3.

That is, the vertical length of the second unit light-condensing bodies 422a is formed relatively longer than the third unit light-condensing bodies 422b, and the second vertical angle $A_2$ is formed to have an angle that is relatively smaller than the third vertical angle $A_3$.

Here, the third vertical angle $A_3$ can be set to an optimum value which can exhibit optimum optical characteristics corresponding to the material of the optical sheet, and the optimum optical characteristics means an angle at which the third unit light-condensing bodies 422b perpendicularly condense light incident from the lower part and deliver the light to the upper part.

Further, the third vertical angle $A_3$ may be formed to have the same angle as the first vertical angle $A_1$ of the first unit light-condensing bodies 412a ($A_1=A_3$).

Meanwhile, in the present embodiment, the pitch along the transverse direction of the second unit light-condensing bodies 422a and the third unit light-condensing bodies 422b may be equally formed, and may be differently formed unlike this.

The lower optical sheet 420 thus configured is stacked between the diffusion sheet 300 and the upper optical sheet 410 to condense the light transferred from the diffusion sheet 300 by the second structural pattern 422 and transfer the light to the upper optical sheet 410.

Meanwhile, the first structural pattern 412 and the second structural pattern 422 may have a triangular shape which extends to incline upward and is formed so that upper end portions meet each other. Further, at least one of the first unit light-condensing bodies 412a to the third unit light-condensing bodies 422b may have a linear cross-sectional trace, and in the present embodiment, the cross-sectional trace of the first structural pattern 412 and the second structural pattern 422 can be linearly formed.

However, the shapes of the illustrated first structural pattern 412 and the second structural pattern 422 are selected to easily understand the configuration according to an embodiment of the present invention rather than being limited to the specific form.

At the same time, the first base film 414 and the second base film 424 may be made of acryl or urethane, and are desirably made of a material of high light transmittance to be able to transmit the light transferred from the diffusion sheet 300.

In the upper optical sheet 410 and the lower optical sheet 420 thus configured, each of the first structural pattern 412 and the second structural pattern 422 has the same cross-sectional area and is formed to extend along one direction so as to have a prismatic shape. The upper optical sheet 410 and the lower optical sheet 420 are joined to each other so that the extension direction of the first structural pattern 412 and the extension direction of the second structural pattern 422 intersect with each other.

At this time, a variety of angles can be applied as the intersection angle of the first structural pattern 412 and the second structural pattern 422, and they are joined at 90 degrees in this embodiment.

Next, the structures of the first structural pattern 412 and the second structural pattern 422 will be described in more detail referring to FIG. 3.

As illustrated, FIG. 3 illustrates the state before the upper optical sheet 410 and the lower optical sheet 420 are joined to each other, and the first structural pattern 412 has the first unit light-condensing bodies 412a that vertically refract and condense the light transferred from the lower part.

Further, the second structural pattern 422 has the second unit light-condensing bodies 422a and the third unit light-condensing bodies 422b that refract and condense the light transferred from the lower part and transfer the light to the upper optical sheet 410, and the third unit light-condensing bodies 422b are formed similarly to the first unit light-condensing bodies 412a. Further, the vertical length in the vertical direction of the second unit light-condensing bodies 422a is formed relatively longer than that of the third unit light-condensing bodies 422b, and the second vertical angle $A_2$ is formed smaller than the third vertical angle $A_3$. Referring to the illustrated drawings, the first vertical angle $A_1$ and third vertical angle $A_3$ have the same angle, and the vertical angle of the second unit light-condensing bodies 422a is $A_2$. Here, $A_1$ and $A_3$ are configured to have an angle that is relatively larger than $A_2$. Further, the distance from the lowest portion to the highest portion of the second unit light-condensing bodies 422a is L1, and the distance from the lowest portion to the highest portion of the third unit light-condensing bodies 422b is L2.

The second unit light-condensing bodies 422a are joined in a semi-cured state rather than being completely cured, when joined to the bottom surface of the first base film 414. Thus, the second unit light-condensing bodies 422a are deformed in the shape in the process of being joined to the bottom surface of the first base film 414, and are joined to the first base film 414. Here, the second vertical angle $A_2$ of the second unit light-condensing bodies 422a increases to get closer to the vertical angle $A_3$ of the third unit light-condensing bodies 422b at the time of joining.

Thus, as the second unit light-condensing bodies 422a increase in the vertical angle when joined with the first base film 414, the inclined angle of the inclined surface formed on the second unit light-condensing bodies 422a is also be deformed together and gets closer to the inclined angle of the inclined surface formed on the third unit light-condensing bodies 422b.

At this time, the third unit light-condensing bodies 422b have the third vertical angle $A_3$ and the inclined angle of the inclined surface capable of exhibiting the optimum optical characteristics corresponding to the material as described above, and the second unit light-condensing bodies 422a are deformed so that the second vertical angle $A_2$ and the inclined angle of the inclined surface are close to the third unit light-condensing bodies 422b.

In this way, when the second structural pattern 422 is joined with the first base film 414, as the vertical angle and the angle of the inclined surface of the second unit light-condensing bodies 422a change, the angle of the inclined surface that refracts and condenses the light is adjusted to a value with optimum optical characteristics, and the second structural pattern 422 stably refracts and condenses the light transferred from the lower part and transfers the light to the upper part.

That is, after joining the upper optical sheet 410 and the lower optical sheet 420, the second vertical angle $A_2$ of the second unit light-condensing bodies 422a is deformed to get closer to the third vertical angle $A_3$ of the third unit light-condensing bodies 422b, and at the same time, the inclined angle of the inclined surface of the second unit light-condensing bodies 422a is deformed to get closer to the inclined angle of the inclined surface of the third unit light-condensing bodies 422b. As a result, the first unit light-condensing bodies 412a through the third unit light-condensing bodies 422b have the inclined angle of the inclined surface that can have the optimum optical characteristics corresponding to the material.

Since the second unit light-condensing bodies 422a having the height of L1 is relatively higher than the third unit light-condensing bodies 422b having the height of L2, when joining the upper optical sheet 410 and the lower optical sheet 420, only the second unit light-condensing bodies 422a are joined to the first base film 412, and the second vertical angle $A_2$ of the second unit light-condensing bodies 422a increases by the pressure in the joining process and gets closer to the angle $A_3$.

Accordingly, the inclined angle of the inclined surface of the second unit light-condensing bodies 422a changes and gets closer to the inclined angle of inclined surface of the third unit light-condensing bodies 422b.

Next, with reference to FIGS. 4 and 5, the process of deformation of the second vertical angle $A_2$ and the shape of the inclined surface of the second unit light-condensing bodies 422a caused by joining of the upper optical sheet 410 and the lower optical sheet 420 will be described as follows.

Figure 4:
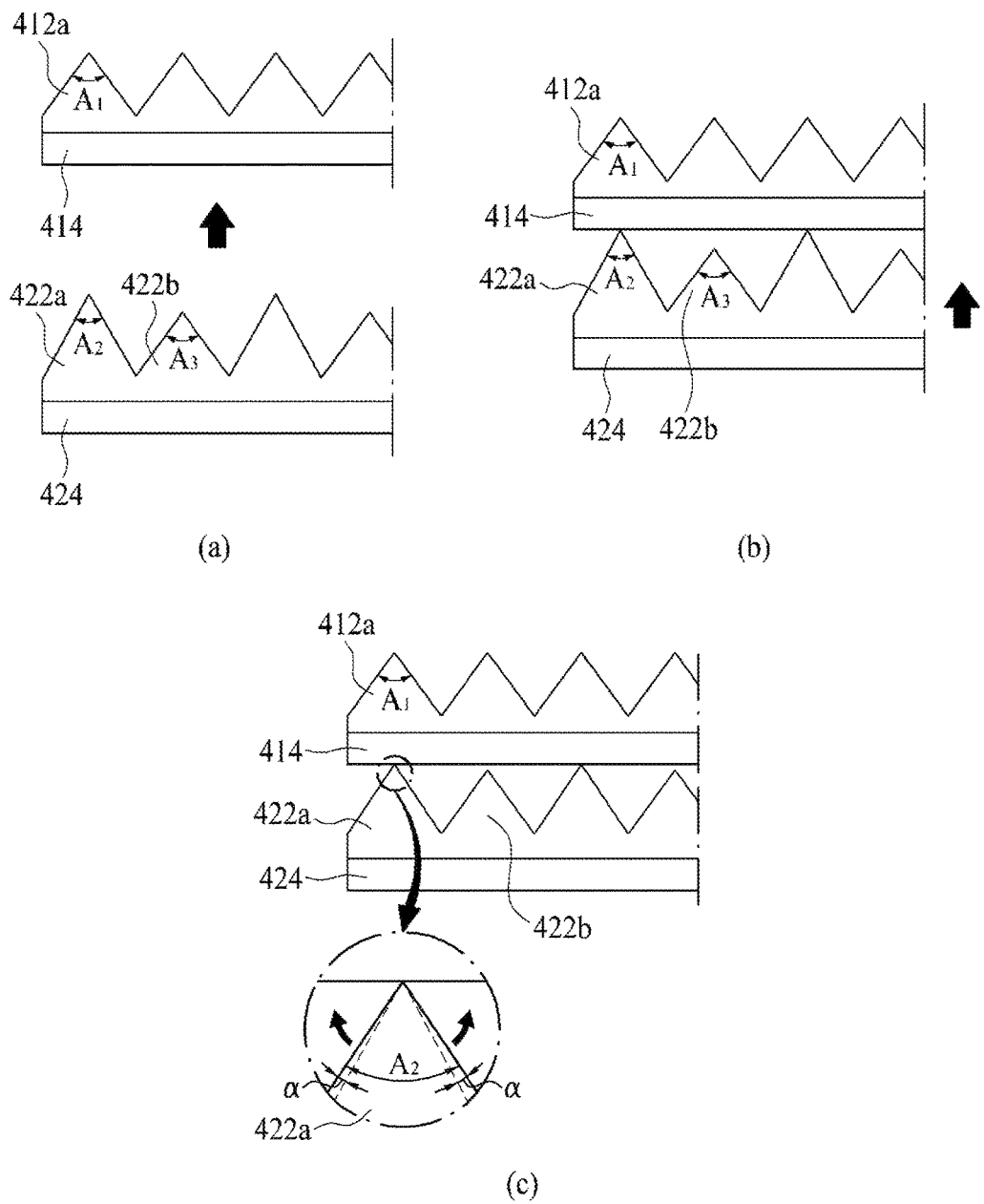
FIG. 4 is a diagram illustrating a state in which the joint is deformed in the lower optical sheet of FIG. 2.
Figure 5:
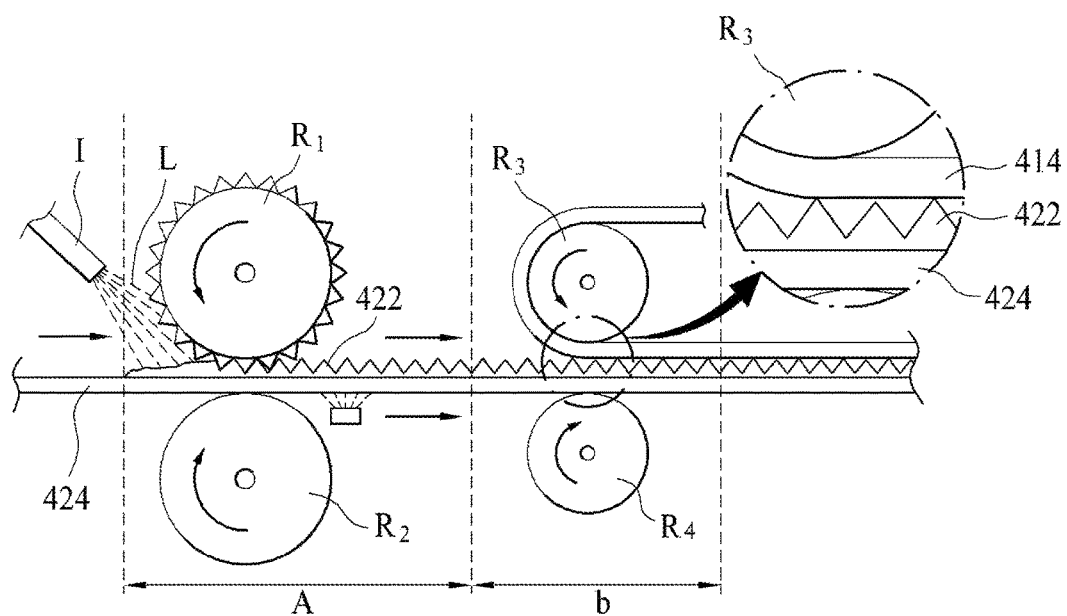
FIG. 5 is a diagram illustrating a state in which the lower optical sheet and the upper optical sheet are stacked in the optical sheet module of FIG. 2 to manufacture the optical sheet module.
Figure 6:
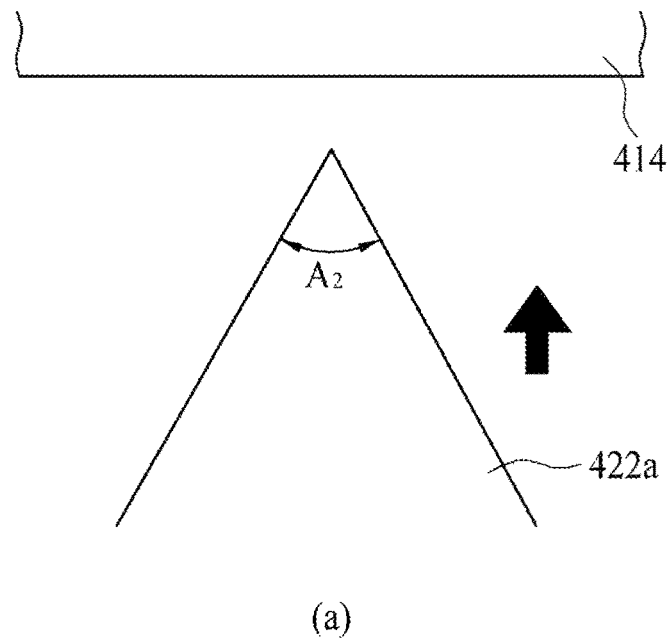
FIG. 6 is a diagram illustrating a change in vertical angle before and after the second unit light-condensing body is joined to the upper base film in the optical sheet module of FIG. 2.
Figure 6:
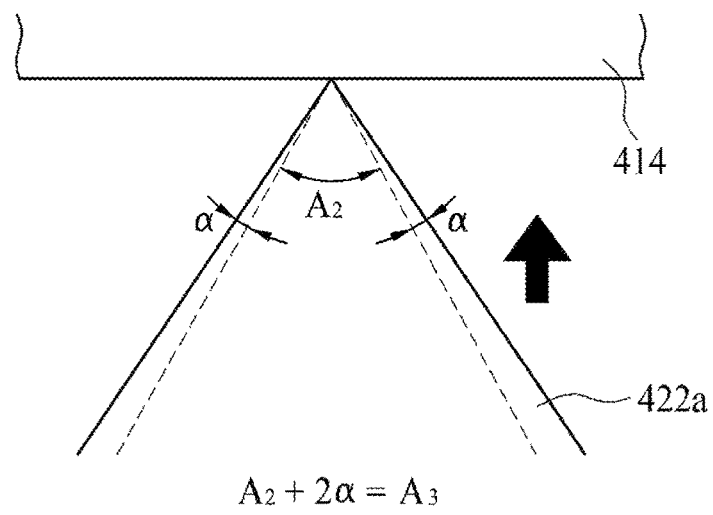

FIG. 4 is a diagram illustrating a state in which deformation of the joint occurs in the lower optical sheet 420 of FIG. 2, FIG. 5 is a diagram illustrating a state in which the lower optical sheet 420 and the upper optical sheet 410 are stacked to manufacture the optical sheet module in the optical sheet module of FIG. 2, and FIG. 6 is a diagram illustrating changes in the vertical angle before and after the second unit light-condensing bodies 422a are joined to the upper base film in the optical sheet module of FIG. 2.

First, FIG. 4(*a*) is a state before the lower optical sheet 420 is joined to the upper optical sheet 410, and a state in which the second unit light-condensing bodies 422a are maintained while not being deformed in the second structural pattern 422.

Here, the first unit light-condensing bodies 412a and the third unit light-condensing bodies 422b are configured to have the same length of the cross-sectional trace, and the length of the cross-sectional trace of the second unit light-condensing bodies 422a is in the state of being fine and relatively longer.

Further, as the lengths of the upper optical sheet 410 and the lower optical sheet 420 get closer to each other as illustrated in FIG. 4(*b*), the highest portion of the second unit light-condensing bodies 422a is in the state if being in contact with the bottom surface of the first base film 414.

At this time, the second unit light-condensing bodies 422a are maintained in a semi-cured state that is not completely cured to serve as an adhesive that joins the upper optical sheet 410 and the lower optical sheet 420.

In this way, when the second unit light-condensing bodies 422a is in contact with the bottom surface of the first base film 414, a fine deformation occurs in the shape by an external force that acts vertically.

Subsequently, FIG. 4(*c*) is a state in which the upper optical sheet 410 and the lower optical sheet 420 are completely joined to each other, the second vertical angle $A_2$ of the second unit light-condensing bodies 422a increases, and the inclined surface is deformed correspondingly.

Specifically, pressure is continuously applied to the upper optical sheet 410 and the lower optical sheet 420 by an external force acting vertically, and the second unit light-condensing bodies 422a being in the semi-cured state increases in the second vertical angle $A_2$ by the pressure, and at the same time, the inclined angle of the inclined surface changes.

In this way, the inclined surface and the second vertical angle $A_2$ of the second unit light-condensing bodies 422a are deformed, and the second structural pattern 422 and the first base film 414 are completely joined to each other.

Through such a process, the inclined angle of the inclined surface of the second unit light-condensing bodies 422a changes, while the second structural pattern 422 is joined to the bottom surface of the first base film 414, and the inclined angle of the inclined surface of the second unit light-condensing bodies 422a and the second vertical angle $A_2$ gets closer to the third unit light-condensing bodies 422b accordingly. At this time, the shape of the cross-sectional trace of the second unit light-condensing bodies 422a is deformed by the pressure of the joining process.

That is, even if the second structural pattern 422 is joined to the lower part of the first base film 412, the third unit light-condensing bodies 422b are not affected. Thus, the third unit light-condensing bodies 422b can be formed to be able to condense the light with the optimum optical characteristics, and after the second unit light-condensing bodies 422a are joined to the first base film 412, the second vertical angle $A_2$ and the inclined angle of the inclined surface are formed to get closer to the third unit light-condensing bodies 422b.

Meanwhile, the process of joining the lower optical sheet 420 and the upper optical sheet 410 will be described referring to FIG. 5. The second base film 424 having a predetermined thickness passes through front roller units R1 and R2 in the region A, and at the same time, and the second structural pattern 422 is formed on the top surface. The front roller units R1 and R2 are disposed by being made up of each of a first front roller R1 and a second front roller R2 at the top and the bottom on the path through which the second base film 424 is transferred.

A constant pattern is formed on the outer peripheral surface of the first front roller R1, and the first front roller R1 is disposed so that its distal end portion is in contact with the top surface of the second base film 424. A constant pattern is not formed on the outer peripheral surface of the second front roller R2, and the second front roller R2 is disposed so that its outer peripheral surface is in contact with the bottom surface of the second base film 424.

Further, the second base film 424 is supplied with liquid L as a raw material of the second structural pattern 422 ejected from a separately provided liquid input unit I, before passing through the front roller units R1 and R2 on the movement path. Thereafter, the liquid L injected on the top surface of the second base film 424 passes through the region A, and the second structural pattern 422 made up of the second unit light-condensing bodies 422a and the third unit light-condensing bodies 422b is formed by the pattern formed on the first front roller R1.

At this time, the liquid L is cured simultaneously with passing through the first front roller R1 to form the second structural pattern 422. Here, the liquid L is in the state of being partially cured rather than being completely cured, and in the state of maintaining the joining force at a constant level.

By passing through each of the first front roller R1 and the second front roller R2 disposed in this manner, the second structural pattern 422 is formed on the top surface of the second base film 424.

Thereafter, wherein the second base film 424 with the second structural pattern 422 formed on the top surface is moved to the region B. In the region B, the second base film 424 transferred from the region A is joined with the first base film 414 supplied from the outside.

The second base film 424 and the first base film 414 are joined with each other, while passing through the rear roller units R3 and R4 provided in the region B. The rear roller units R3 and R4 are made up of a pair of first rear roller R3 and a second rear roller R4, and each of the rollers is disposed on the path through which the first base film 414 and the second base film 424 are joined and moved.

Thus, the first base film 414 is moved along the first rear roller R3, and is joined to the second base film 424 in the Region B. The first base film 414 is pressed and joined by the first rear roller R3 and the second rear roller R4, while the bottom surface of the first base film 414 is in contact with the upper end portion of the second unit light-condensing bodies 422a formed above the second base film 424.

At this time, because the second structural pattern 422 is not in the completely cured state, the upper end portion of the second structural pattern 422 and the bottom surface of the first base film 414 are joined with each other by pressing of the rear roller units R3 and R4. Further, while the lower optical sheet 420 and the first base film 414 joined with each other pass through the region B, the second structural pattern 422 is completely cured to enter the state of being joined to the first base film 414.

In this way, when joining the lower optical sheet 420 and the first base film 412, they are pressed and joined by the aforementioned rear roller units R3 and R4, and the pressure is applied to the second light-condensing bodies 422a through the joining process, so that the second vertical angle $A_2$ and the inclined angle of the inclined surface change to get closer to the third unit light-condensing bodies 422b.

FIG. 6 illustrates the states before and after joining of the second unit light-condensing bodies 422a and the second base film. FIG. 6(a) is the state before the second unit light-condensing bodies 422a are joined to the first base film 412, in which second unit light-condensing bodies 422a have a second vertical angle $A_2$ and form an inclined surface.

Further, FIG. 6(b) is the state in which the second unit light-condensing bodies 422a are joined to the bottom surface of the first base film 412, in which the second vertical angle $A_2$ has an angle in which the angle of $A_2$ is increased by $2\alpha$. Here, $\alpha$ indicates an angle at which the second unit light-condensing bodies 422a are joined and the second vertical angle $A_2$ increases by joining.

That is, because the second unit light-condensing bodies 422a are pressed while passing through the rear roller units R3 and R4 as described above, the second vertical angle $A_2$ increases by the pressure, and at the same time, bending occurs in the inclined surface and the inclined angle varies.

Of course, the second vertical angle $A_2$ and the inclined surface of the second unit light-condensing bodies 422a only minutely change rather than significantly changing, but are exaggerated to help the clear understanding of the present invention.

In this way, through a process in which the second unit light-condensing bodies 422a are joined to the bottom surface of the first base film 412, $A_2$ as the second vertical angle $A_2$ increases by $2\alpha$, bending occurs in the inclined surface and the inclined angle changes accordingly. At this time, the sum of the angles of $A_2$ and $2\alpha$ is desirably an angle that gets closer to the third vertical angle $A_3$ or the first vertical angle $A_1$.

Next, depending on the angles of the second vertical angle A2, in the state in which the upper optical sheet 410 and the lower optical sheet 420 are joined to each other, the refraction angles of light condensed by the second structural pattern 422 will be described in comparison referring to FIG. 7.

Figure 7:
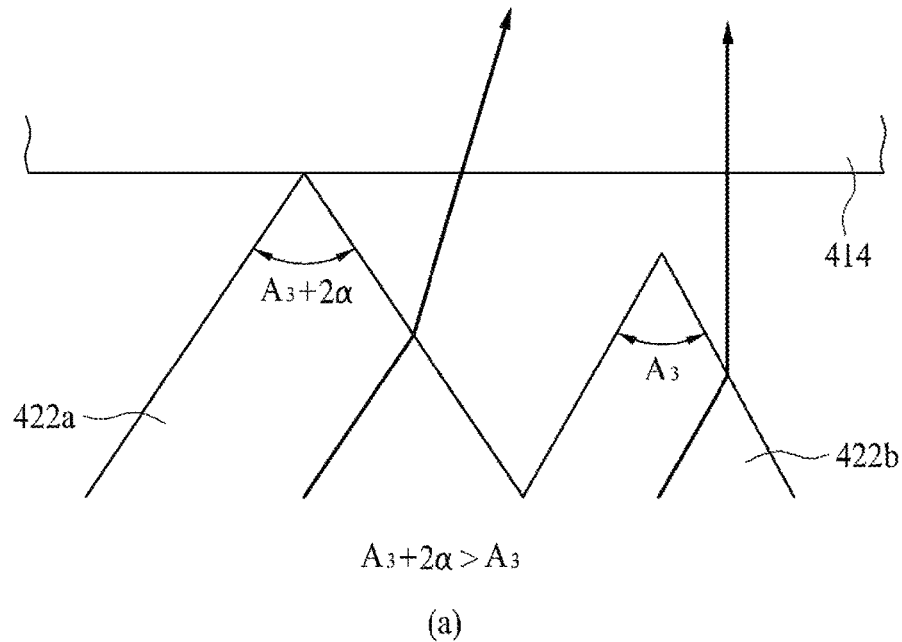
FIG. 7 is a diagram illustrating a state in which the light is refracted depending on the magnitude of the vertical angle in the state in which the upper optical sheet and the second unit light-condensing body of FIG. 2 are joined to each other.
Figure 7:
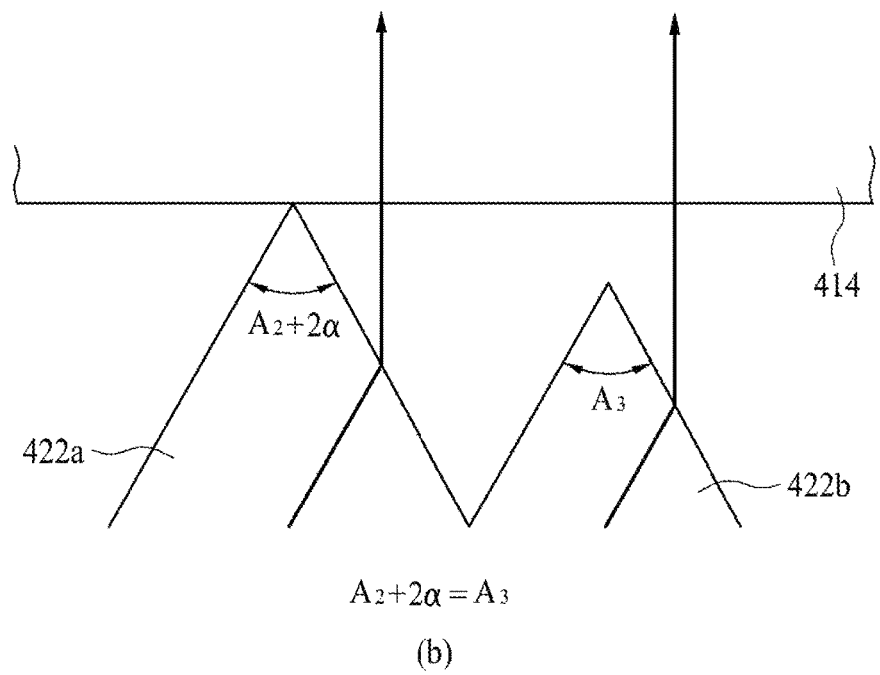

FIG. 7 is a diagram illustrating a state in which light is refracted depending on the sizes of the vertical angles in the state in which the upper optical sheet 410 and the second unit light-condensing bodies 422a of FIG. 2 are joined to each other.

FIG. 7(a) is a state in which the second unit light-condensing bodies 422a and the third unit light-condensing bodies 422b are joined to the first base film 412, while having the same vertical angle $A_3$. The second unit light-condensing bodies 422a has the vertical angle of $A_3+2\alpha$ after joined, and the inclined angle of the inclined surface also changes accordingly.

In such a case, the inclined angle of the inclined surface of the third unit light-condensing bodies 422b and the inclined angle of the inclined surface of the second unit light-condensing bodies 422a are formed to be different from each other, and thus, each of the unit light-condensing bodies refracts and condenses the light transferred from the lower part in different directions.

As illustrated, although the third unit light-condensing bodies 422b vertically refract the light transferred from the lower part and transfer the light to the upper part, because the second unit light-condensing bodies 422a are different from the inclined angle of the inclined surface of the third unit light-condensing bodies 422b, the second unit light-condensing bodies 422a cannot vertically refract light transferred from the lower part and the condensing effect decreases.

However, unlike this, FIG. 7(b) is another aspect of the embodiment of the present invention in which the second unit light-condensing bodies 422a and the third unit light-condensing bodies 422b are joined to the lower part of the first base film 412 in the state of $A_2$ in which the second vertical angle $A_2$ is relatively smaller than the third vertical angle $A_3$.

When the second unit light-condensing bodies 422a is joined to the lower part of the first base film 412 in the state in which the second vertical angle $A_2$ is $A_2$, as described above, the second vertical angle $A_2$ increases by the pressure. Accordingly, the angle gets closer to the third vertical angle $A_3$ of the third unit light-condensing bodies 422b, and the inclined angle of the inclined surface of the second unit light-condensing bodies 422a gets closer to the inclined angle of the inclined surface of the third unit light-condensing bodies 422b.

Further, the second unit light-condensing bodies 422a and the third unit light-condensing bodies 422b have a similar form in such a state, thereby vertically refracting and condensing the light transferred from the lower part and transferring the light to the upper part.

Comparing the light condensing effects according to each of the state of FIG. 7(a) and the state of FIG. 7(b), in the case of FIG. 7(a), after the joining of the second unit light-condensing bodies 422a and the first base film 412, the second vertical angle A2 and the third vertical angle A3 have different angles, and thus, the respective inclined angles of the inclined surfaces are different from each other and the light condensing effect decreases.

However, as in the embodiment of the present invention, in the case of FIG. 7(b), after the joining of the second unit light-condensing bodies 422a and the first base film 412, since the second vertical angle $A_2$ and the third vertical angle $A_3$ are the same and form a similar inclined angle of the inclined surface, the light condensing effect of the light transferred from the lower part increases.

That is, because the present invention is designed in consideration of the vertical angle and the inclined angle of the inclined surface of the second unit light-condensing bodies 422a joined when joining the upper optical sheet 410 and the lower optical sheet 420, the inclined surface after the joining condenses the light, while having the optimum inclined angle, and it is possible to increase the brightness of the condensed light accordingly.

In this way, in the optical sheet module according to the present invention, the second structural pattern 422 includes the second unit light-condensing bodies 422a and the third unit light-condensing bodies 422b, and the second unit light-condensing bodies 422a are formed in consideration of the second vertical angle $A_2$ and the inclined angle of the inclined surface caused by the pressure when joined with the first base film 412. Thus, the second structural pattern 422 is configured to be able to condense the light depending on the optimum optical characteristics, when the second unit light-condensing bodies 422a are joined with the first base film 412.

Next, with reference to FIGS. 8 to 10, a configuration in which separate adhesive layer 430 is further provided in the optical sheet module 400 according to an embodiment of the present invention will be described.

Figure 8:
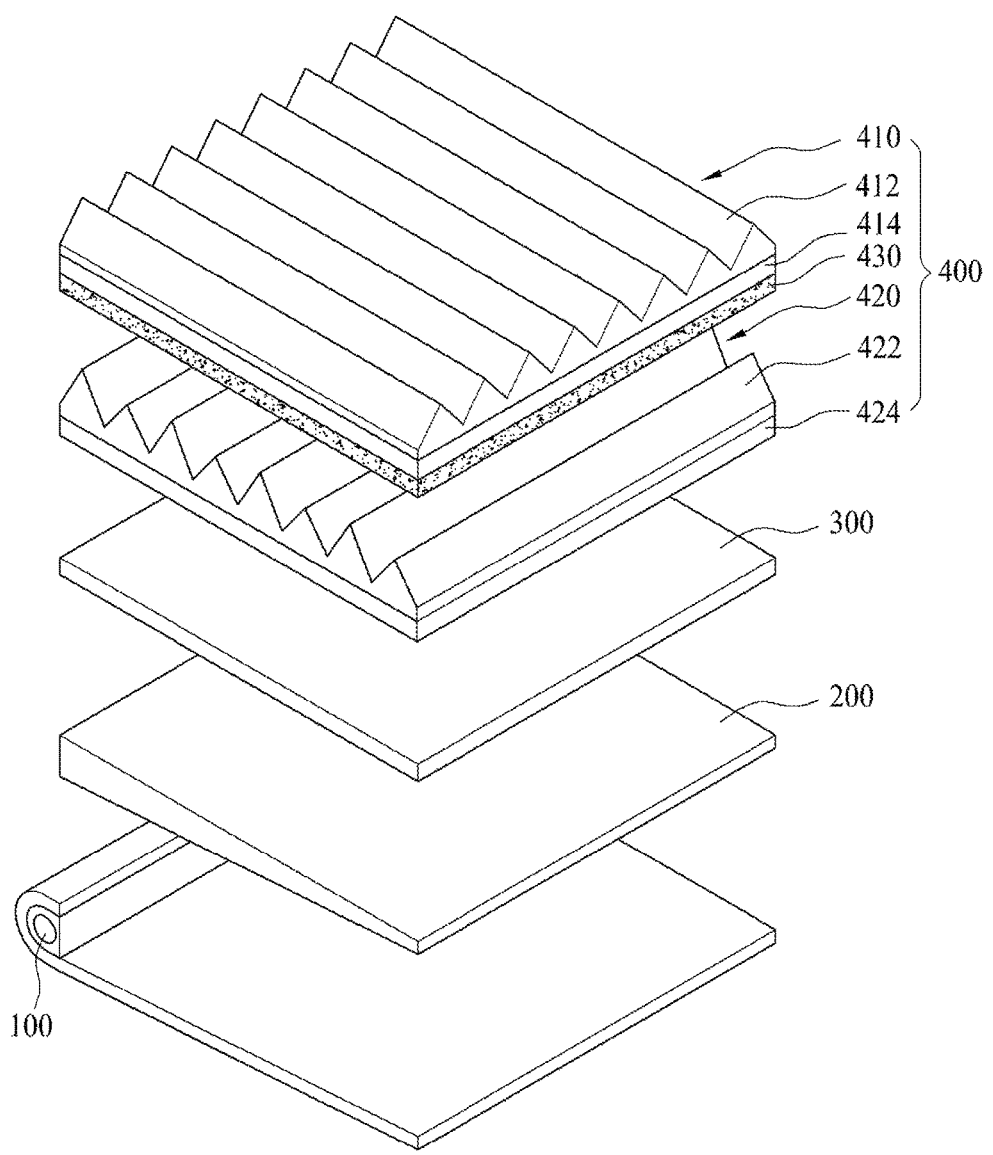
FIG. 8 is a diagram illustrating a configuration in which a separate adhesive layer is further included in the optical sheet module of FIG. 2.
Figure 9:
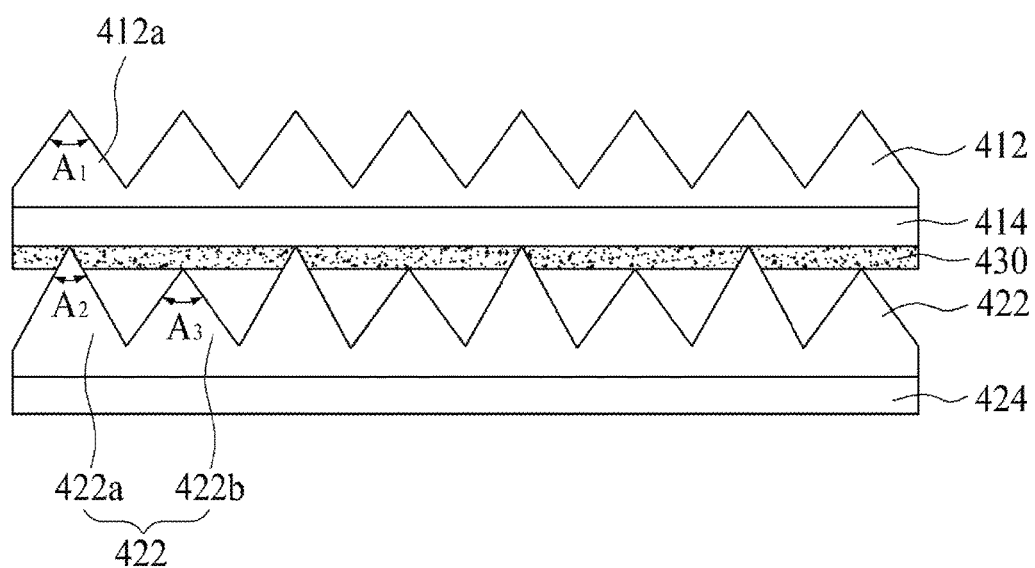
FIG. 9 is a diagram illustrating a state in which the joint is embedded in the adhesive layer of FIG. 8.
Figure 10:
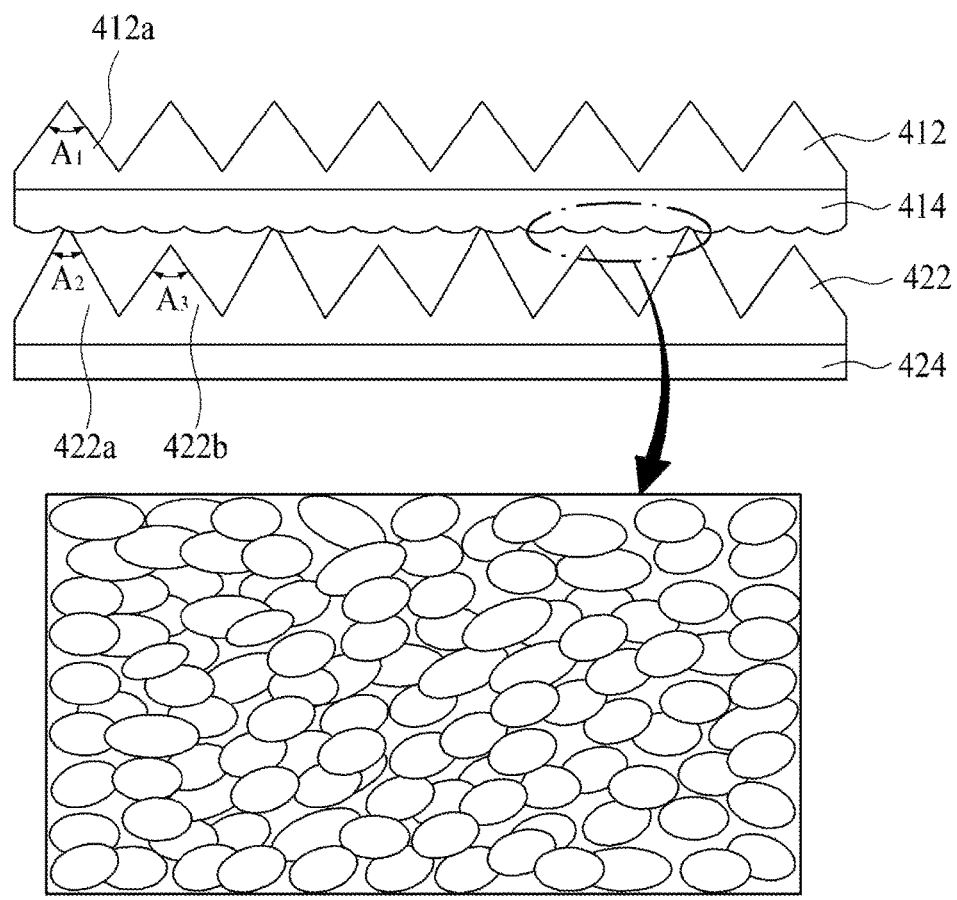
FIG. 10 is a diagram illustrating a state in which the form of the adhesive layer is deformed in the optical sheet module of FIG. 8.

FIG. 8 is a diagram illustrating a configuration in which the optical sheet module of FIG. 2 further includes a separate adhesive layer 430, FIG. 9 is a diagram illustrating a state in which the joint is embedded in the adhesive layer 430 of FIG. 8, and FIG. 10 is a diagram illustrating a state in which the shape of the adhesive layer 430 is deformed in the optical sheet module of FIG. 8.

As illustrated in FIG. 8, the basic configuration is the same, but a separate adhesive layer 430 is further provided between the upper optical sheet 410 and the lower optical sheet 420 in the optical sheet module 400.

The optical sheet module 400 is configured to include the upper optical sheet 410, the lower optical sheet 420 and a separate adhesive layer 430.

The adhesive layer 430 is provided below the upper optical sheet 410 to allow the upper optical sheet 420 and the lower optical sheet 410 to be joined with each other. At this time, the adhesive layer 430 is desirably made of a material having the high light transmittance to transmit the light transferred from the diffusion sheet 300.

In this way, because the optical sheet module 400 is configured to further include the adhesive layer 430, upon joining of the second structural pattern 422 and the first base film 414, the second unit light-condensing bodies 422a are embedded in the interior of the adhesive layer 430 without serving as an adhesive.

That is, the adhesive layer 430 is located on the bottom surface of the first base film 414, and the upper parts of the second unit light-condensing bodies 422a are embedded in the interior of the adhesive layer 430 below the first base film 414.

Further, because the second unit light-condensing bodies 422a are embedded in the interior of the adhesive layer 430, the joined area becomes greater, and the joining quality between the upper optical sheet 410 and the lower optical sheet 420 increases accordingly.

In this way, when the upper end portions of the second unit light-condensing bodies 422a are embedded in the interior of the adhesive layer 430, as illustrated in FIG. 9, the second vertical angle $A_2$ increases while the upper end portions of the second unit light-condensing bodies 422a are subjected to the pressure, and the inclined angle of the inclined surface of the second unit light-condensing bodies 422a changes accordingly.

Specifically, when the upper end portions of the second unit light-condensing bodies 422a are buried in the interior of the adhesive layer 430, the upper end portions are deformed by the pressure in the joining process, the second vertical angle $A_2$ and the inclined angle of the inclined surface of the second unit light-condensing bodies 422a are adjusted and get closer to the third vertical angle $A_3$ and the inclined angle of the inclined surface of the third unit light-condensing bodies 422b, thereby making it possible to stably condense the light.

That is, the second unit light-condensing bodies 422a change in the shape of the cross-section locus in the joining process of being embedded in the adhesive layer 430, and the inclined angle of the inclined surface gets closer to the inclined angle of the inclined surface of the third unit light-condensing bodies 422b, and thus, the angle of refracting the light transferred from the lower part is adjusted to condense the light in the vertical direction.

Further, because the third unit light-condensing bodies 422b have a vertical distance relatively shorter than the second unit light-condensing bodies 422a, the third unit light-condensing bodies 422b are not embedded in the interior of the adhesive layer 430, and the third vertical angle $A_3$ and the inclined angle of the inclined surface are not deformed.

Here, because the third vertical angle $A_3$ and the inclined angle of the inclined surface of the third unit light-condensing bodies 422b are set to the values capable of exhibiting the optimum optical characteristics in correspondence to the material as described above, the second unit light-condensing bodies 422a change in the joining process accordingly and get closer to be able to exhibit the optimum optical characteristics.

Thus, the third unit light-condensing bodies 422b set the third vertical angle $A_3$ and the inclined angle of the inclined surface to the optimum state for condensing the light transferred from the lower part, and the second unit light-condensing bodies 422a set the second vertical angle $A_2$ and the inclined angle of inclined surface, in consideration of the deformation at the time of joining.

In this way, the joining quality is improved by embedding the end portions of the second unit light-condensing bodies 422a in the interior of the adhesive layer 430, and by setting the second vertical angle A2 and the inclined angle of the inclined surface of the second unit light-condensing bodies 422a in consideration of the deformation when joining the second unit light-condensing bodies 422a with the first base film 412, a decrease in brightness of light refracted and condensed by the second structural pattern 422 is prevented.

Meanwhile, the configuration in which the adhesive layer 430 has an uneven thickness will be described referring to FIG. 10.

As illustrated, the adhesive layer 430 has an uneven thickness unlike the above-described configuration, and may be formed so that only some of the upper end portions of the second unit light-condensing bodies 422a are embedded.

Specifically, a joining pattern having an uneven thickness is formed on the surface of the adhesive layer 430 joined with the second structural pattern 422, and the joining pattern is formed to have various sizes, shapes and thicknesses.

In this way, as the joining pattern is formed in the lower part of the adhesive layer 430, only some of the second unit light-condensing bodies 422a are embedded and joined to the interior of the adhesive layer 430. Thus, by reducing the number of the second unit light-condensing bodies 422a embedded in the interior of the adhesive layer 430, the inclined surface loss due to the internal embedment of the adhesive layer 430 is reduced to minimize a decrease in the light condensing effect.

Next, a modified form of the second structural pattern 422 will be described with reference to FIGS. 11 and 12.

Figure 11:
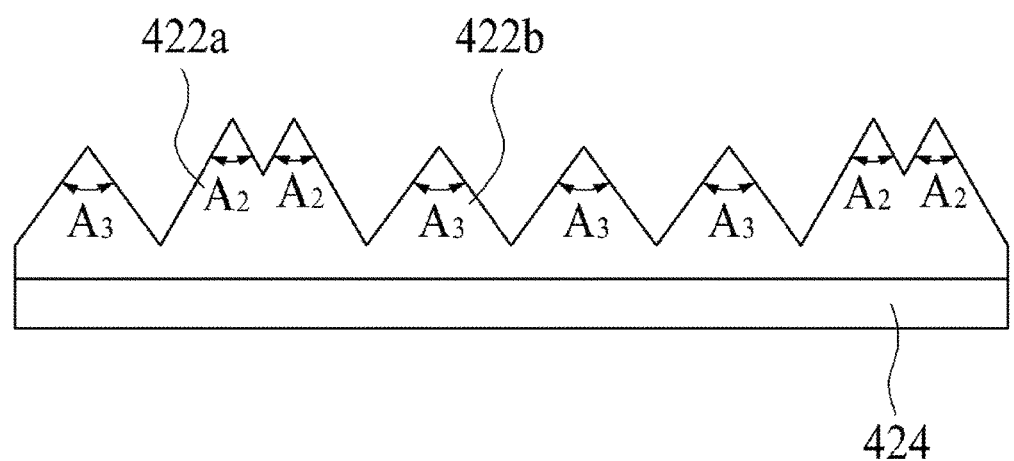
FIG. 11 is a diagram illustrating a modified form of the second structural pattern in the lower optical sheet of FIG. 2.
Figure 12:
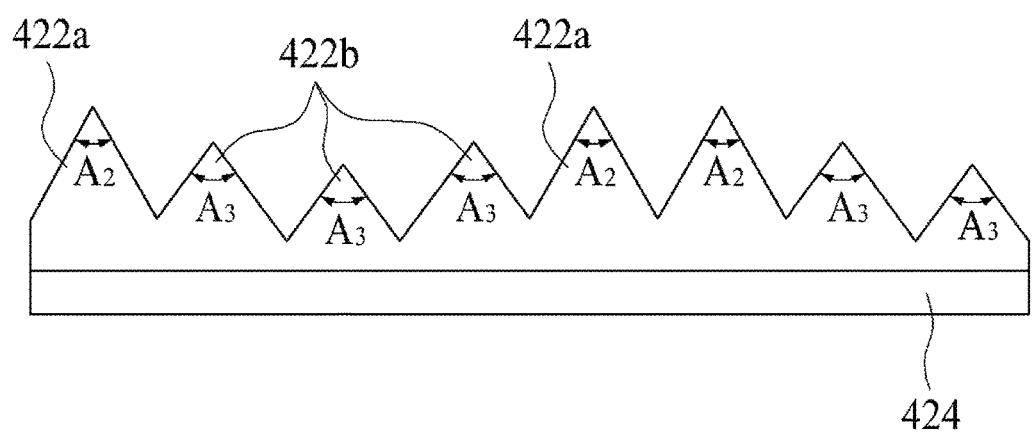
FIG. 12 is a diagram illustrating still another modified form of the second structural pattern in the lower optical sheet of FIG. 2.

FIG. 11 is a diagram illustrating a modified form of the second structural pattern 422 in the lower optical sheet 420 of FIG. 2, and FIG. 12 is a diagram illustrating another modified form of the second structural pattern 422 in the lower optical sheet 420 of FIG. 2.

First, looking at FIG. 11, some of the plurality of second unit light-condensing bodies 422a and the third unit light-condensing bodies 422b are continuously disposed, and length of the cross-section locus is asymmetrically formed.

Specifically, referring to FIG. 11, a plurality of second unit light-condensing bodies 422a are disposed adjacent to one another, but each of them is formed to overlap one another with different lateral pitches, thereby having the same second vertical angle $A_2$ and the inclined angle of the inclined surface, but the cross-sectional trace length of the inclined surface is formed asymmetrically.

In this way, since the cross-sectional trace length of the inclined surface of the second unit light-condensing bodies 422a is formed asymmetrically, it is possible to prevent an occurrence of a Moire phenomenon caused by light condensed through the second structural pattern 422. Further, it is also possible to reduce an occurrence of Wet-out phenomenon by limiting the proximity in which the third unit light-condensing bodies 422b reaches the upper base film.

Next, referring to FIG. 12, a plurality of third unit light-condensing bodies 422b is provided, and the vertical distance from the lowest portion to the highest portion is unevenly formed. That is, since the third unit light-condensing bodies 422b have the vertical lengths of various lengths rather than having the uniform vertical distance, unlike the second unit light-condensing bodies 422a, each of the third unit light-condensing bodies 422b have a variety of sizes and cross-sectional shapes.

At this time, the vertical distance from the lowest portion to the highest portion of the second unit light-condensing bodies 422a is uniformly configured, all the second vertical angles $A_2$ are formed as the same angle, and the inclined angle of the inclined surface is also formed equally. However, the vertical distance from the lowest portion to the highest portion of the third unit light-condensing bodies 422b are made uneven, and at the same time, the third vertical angle $A_3$ and the inclined angle of the inclined surface are formed at the highest portion to have the same angle.

That is, although the second unit light-condensing bodies 422a are formed to have the uniform vertical distance, the second vertical angle $A_2$ and the inclined angle of inclined surface, only the third vertical angle $A_3$ and the inclined angle of the inclined surface of the third unit light-condensing bodies 422b are the same, and the vertical distance from the lowest portion to the highest portion is formed unevenly. Further, as illustrated, the length of the trace of the inclined surface cross-section of the third unit light-condensing bodies 422b can be asymmetrically formed.

Thus, the length and the size of the inclined surface formed by the third unit light-condensing bodies 422b, and the vertical distance along the vertical direction are unevenly formed, and by adjusting the height of the inclined surface formed by the third unit light-condensing bodies 422b, the line that may occur on the sheet surface may be difficult to be detected by the human eye.

However, unlike this, the third unit light-condensing bodies 422b have the same cross-sectional shape, and their sizes may be differently formed.

Figure 13:
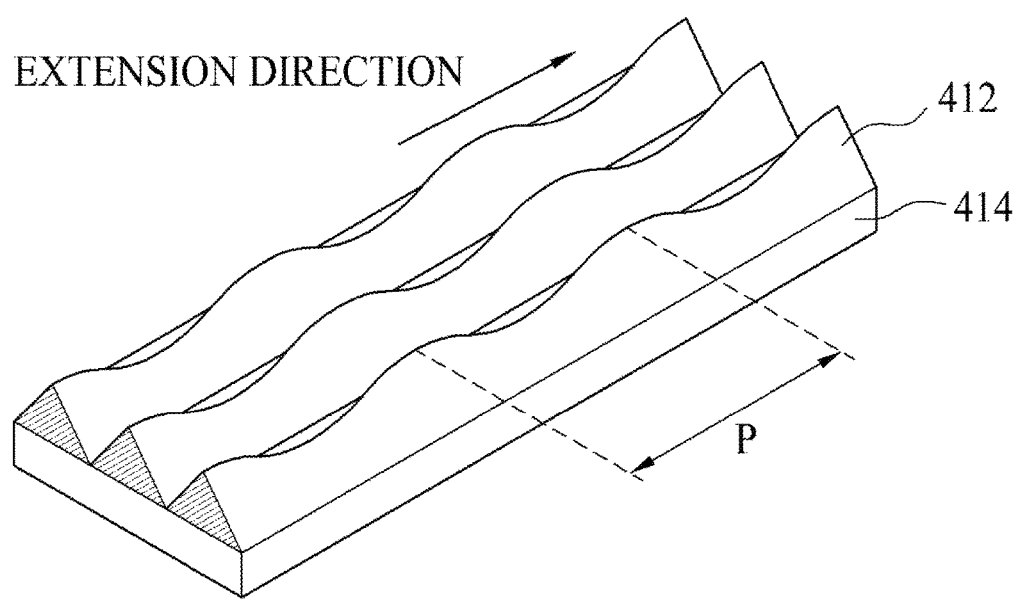
FIG. 13 is a diagram illustrating a form of a change in height of the first structural patter in the optical sheet module of FIG. 2.

Meanwhile, in the optical sheet module of the present invention, as illustrated in FIG. 13, the height of the first structural pattern 412 of the upper optical sheet 410 may vary along the extension direction. In this case, the height of the first structural pattern 412 may vary while keeping a constant period P, but the height may vary unevenly along the extension direction.

Next, a configuration in which the optical sheet module according to an embodiment of the present invention includes another reflective polarizing film will be described with reference to FIGS. 14 and 15.

Figure 14:
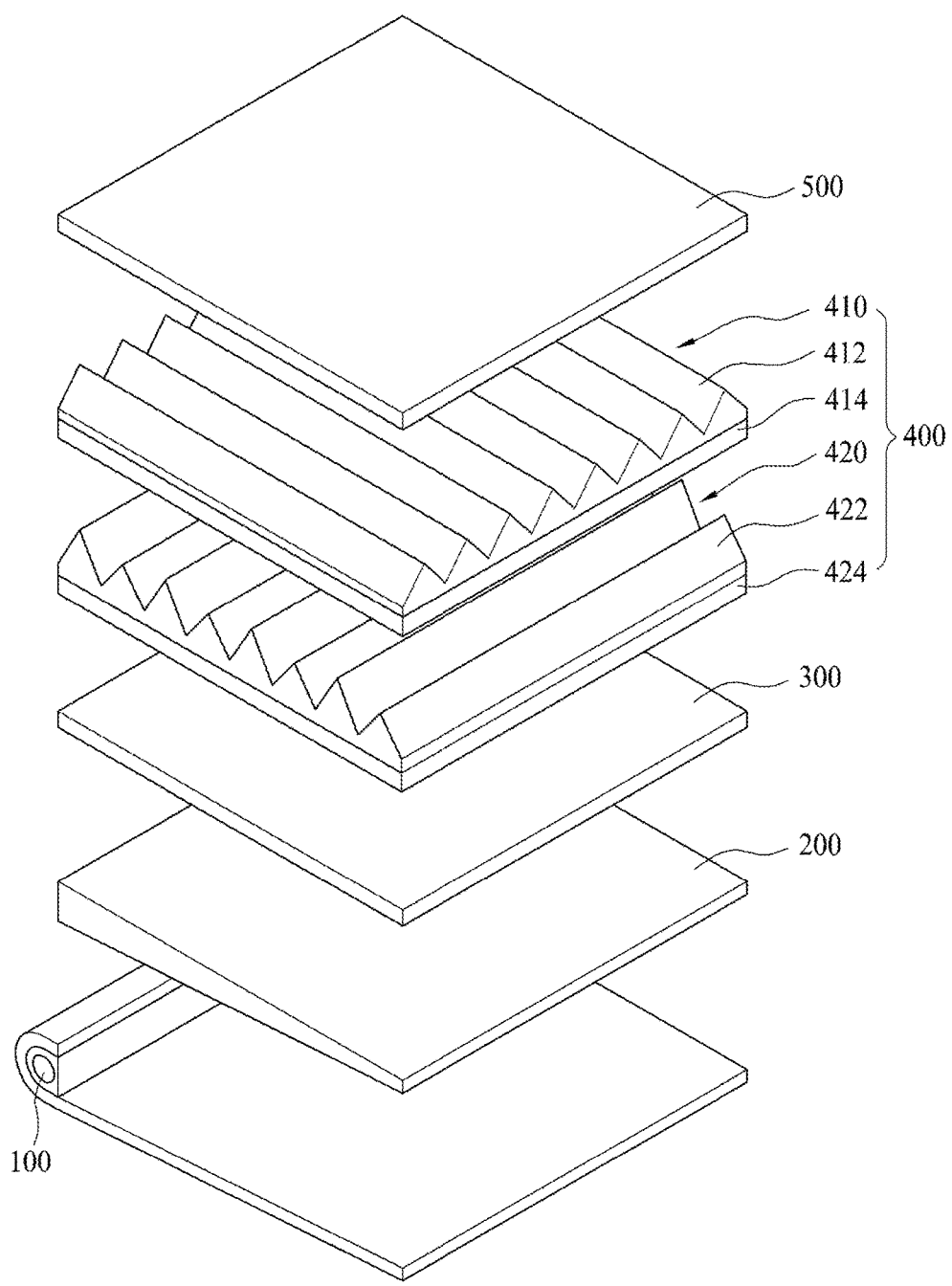
FIG. 14 is an exploded perspective diagram illustrating a state in which a reflective polarizing film is further included in the optical sheet module of FIG. 2.
Figure 15:
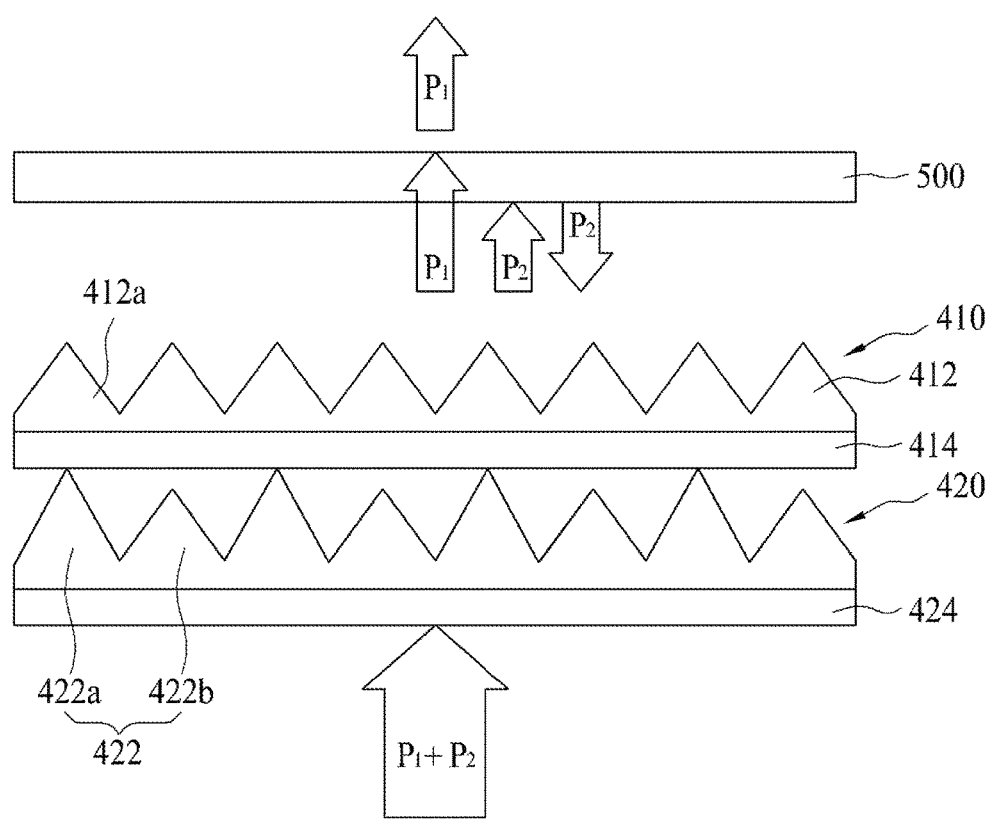
FIG. 15 is a diagram illustrating a state in which light is transmitted or reflected by the reflective polarizing film of FIG. 13.

FIG. 14 is an exploded perspective diagram illustrating a state in which the reflective polarizing film is further included in the optical sheet module of FIG. 2, and FIG. 15 is a diagram illustrating a state in which light is transmitted or reflected by the reflective polarizing film of FIG. 14.

Referring to the illustrated drawings, a configuration in which a separate reflective polarizing film 500 is further included and stacked on the top of the optical sheet 410 is illustrated, and the light condensed by the upper optical sheet 410 and the lower optical sheet 420 is selectively transmitted.

The reflective polarizing film (reflective polarizer) 500 serves to selectively transmit light of one light polarization state and to return the light with the different polarization state to the light guide plate 200. There is a dual brightness enhancement film (DBEF) as an example of film.

The light reflected without passing through the DBEF is re-reflected through the light guide plate 200 of the lower end of the BLU and is directed to the upper part again. The DBEF repeats a role of continuously reflecting the remaining light, after allowing the only the light with the correct polarization to pass.

Since the light of desired polarization is emitted to the upper part through repetition of such a process, the loss of the emitted light is reduced and the brightness of the display module is enhanced.

More specifically, as illustrated in FIG. 13, the reflective polarizing film 500 is disposed to be stacked on the top of optical sheet 410, and light condensed while passing through the upper optical sheet 410 and the lower optical sheet 420 is directed toward the reflective polarizing film 500. Here, the light directed to the reflective polarizing film 500 is in the state in which lights of different polarizations are mixed with each other, and is made up of a light P1 having the polarization of the region transmitted by the reflective polarizer film 500, and a light P2 having polarization of a region that is not transmitted by the reflective polarizing film 500.

As illustrated, light passed through the upper optical sheet 410 and the lower optical sheet 420 are in the mixed state of P1 and P2, but the reflective polarizing film 500 transmits only the light P1 and reflects the light P2 in the downward direction again.

Thus, the light P1 is emitted to the outside, but the light P2 is reflected and returns to the lower part, is reflected by the light guide plate 200 or the like and is moved upward again. Through this process, the polarization state of the light P2 changes, and is converted into a state suitable for being transmitted by the reflective polarizing film 500 through such repetition.

In this way, by providing the reflective polarizing film 500, the loss of light is reduced, and light having a desired refractive angle and wavelength required is emitted upward, which makes it possible to increase the brightness of the display module.

Meanwhile, the reflective polarizing film 500 may also be stacked and disposed between the upper optical sheet 410 and the lower optical sheet 420 as well as being stacked and disposed above the upper optical sheet 410.

While the preferred embodiments of the present invention have been described above, the present invention may be embodied in other forms without departing in spirit or category in addition to the embodiments described above. Thus, the present embodiments should be considered as being illustrative rather being than limited to the particular forms, and the present invention may also be modified in the category of the appended claims and the scope of their equivalents without being limited to the above description accordingly.

The invention claimed is:

1. A stacked optical sheet module, comprising:
an upper optical sheet having a bottom surface and a first structural pattern in which first unit light-condensing bodies are successively repeated, cross-sectional areas of the first unit light-condensing bodies gradually decreasing towards a top; and
a lower optical sheet which has a second structural pattern and is disposed below the upper optical sheet in a stacked form, second unit light-condensing bodies and third unit light-condensing bodies being combined and successively disposed in the second structural pattern, the second unit light-condensing bodies respectively having a gradually decreasing cross-sectional area toward the top and being joined with the upper optical sheet, and the third unit light-condensing bodies respectively having a gradually decreasing cross-sectional area toward the top, a vertical distance from a lowest portion to a highest portion of each of the third unit light-condensing bodies being formed relatively shorter than a vertical distance from a lowest portion to a highest portion of each of the second unit light-condensing bodies,
wherein a vertical angle of the highest portion of each of the second unit light-condensing bodies is formed relatively smaller than a vertical angle of the highest portion of each of the third unit light-condensing bodies, and
wherein the second structural pattern is at least partially directly joined to the bottom surface of the upper optical sheet.

2. The stacked optical sheet module of claim 1, wherein upper end portions of the second unit light-condensing bodies are joined to the bottom surface of the upper optical sheet and are deformed in a joining process.

3. The stacked optical sheet module of claim 1, wherein the upper end portions of the second unit light-condensing bodies are joined to the bottom surface of the upper optical sheet, and a shape of a cross-sectional trace of at least one of the joined second unit light-condensing bodies is deformed by pressure in a joining process.

4. The stacked optical sheet module of claim 1, wherein the bottom surface of the upper optical sheet comprises an adhesive layer which is formed between the upper optical sheet and the lower optical sheet and into which an upper end portion of the second structural pattern is embedded.

5. The stacked optical sheet module of claim 4, wherein upper end portions of the second unit light-condensing bodies are embedded and joined into an interior of the adhesive layer and are deformed by pressure in a joining process.

6. The stacked optical sheet module of claim 4, wherein upper end portions of the second unit light-condensing bodies are embedded and joined to an interior of the adhesive layer, and a shape of a cross-section locus of at least one of the second unit light-condensing bodies is deformed in a joining process.

7. The stacked optical sheet module of claim 4, wherein the adhesive layer has an uneven thickness, and upper end portions of the second unit light-condensing bodies are only partially embedded in the adhesive layer.

8. The stacked optical sheet module of claim 1, wherein the vertical distance from the lowest portion to the highest portion of at least one of the third unit light-condensing bodies is formed unevenly.

9. The stacked optical sheet module of claim 8, wherein the third unit light-condensing bodies each have cross-sections of sizes and shapes different from each other.

10. The stacked optical sheet module of claim 8, wherein a length of a cross-section trace of at least one of the of third unit light-condensing bodies is formed asymmetrically.

11. The stacked optical sheet module of claim 1, wherein each of the third unit light-condensing bodies has a vertical angle same as each of the first unit light-condensing bodies.

12. The stacked optical sheet module of claim 1, wherein a trace of a cross-section of at least one of the first unit light-condensing bodies to the third unit light-condensing bodies is made up of a straight line.

13. The stacked optical sheet module of claim 1, wherein the vertical angle of each of the third unit light-condensing bodies has an optimum value that can exhibit optimum optical characteristics corresponding to a material thereof.

14. The stacked optical sheet module of claim 1, wherein shapes of cross sections of the first unit light-condensing bodies to the third unit light-condensing bodies are a triangular shape.

15. The optical sheet module of claim 1, further comprising: a reflective polarizing film which is disposed with the lower optical sheet and the upper optical sheet in the stacked form to selectively transmit the light depending on a polarization of light transferred from a lower part thereof.

16. The stacked optical sheet module of claim 15, wherein the reflective polarizing film is provided by being stacked between the upper optical sheet and the lower optical sheet.

17. The stacked optical sheet module of claim 15, wherein the reflective polarizing film is provided by being stacked on the top of the upper optical sheet.

18. The stacked optical sheet module of claim 1, wherein the first structural pattern changes in height along an extension direction thereof.

19. The stacked optical sheet module of claim 18, wherein the upper optical sheet and the lower optical sheet are disposed so that the extension direction of the first structural pattern and the extension direction of the second structural pattern intersect with each other.

20. The stacked optical sheet module of claim 19, wherein the extension direction of the first structural pattern and the extension direction of the second structural pattern perpendicularly intersect with each other.

21. A stacked optical sheet module, comprising:
an upper optical sheet having a bottom surface and a first structural pattern in which first unit light-condensing bodies are successively repeated, cross-sectional areas of the first unit light-condensing bodies gradually decreasing toward a top; and
a lower optical sheet which has a second structural pattern and is disposed below the upper optical sheet in a stacked form, second unit light-condensing bodies and third unit light-condensing bodies being combined and successively disposed in the second structural pattern, the second unit light-condensing bodies respectively being formed with an inclined surface having a gradually decreasing cross-sectional area toward the top and being joined with the upper optical sheet, and the third unit light-condensing bodies respectively being formed with an inclined surface having a gradually decreasing cross-sectional area toward the top, a vertical distance from a lowest portion to a highest portion of each of the third unit light-condensing bodies being formed relatively shorter than a vertical distance from a lowest portion to a highest portion of each of the second unit light-condensing bodies, wherein an inclined angle of the inclined surface of each of the second unit light-condensing bodies is formed relatively larger than an inclined angle of the inclined surface of each of the third unit light-condensing bodies, and wherein the second structural pattern is at least partially directly joined to the bottom surface of the upper optical sheet.

22. The stacked optical sheet module of claim 21, wherein upper end portions of the second unit light-condensing bodies are joined to the bottom surface of the upper optical sheet and are deformed in a joining process.

23. The stacked optical sheet module of claim 21, wherein the upper end portions of the second unit light-condensing bodies are joined to the bottom surface of the upper optical sheet, and a shape of a cross-sectional trace of at least one of the joined second unit light-condensing bodies is deformed by pressure in a joining process.

24. The stacked optical sheet module of claim 21, wherein the bottom surface of the upper optical sheet comprises an adhesive layer which is formed between the upper optical sheet and the lower optical sheet and into which an upper end portion of the second structural pattern is embedded.

25. The stacked optical sheet module of claim 24, wherein upper end portions of the second unit light-condensing bodies are embedded and joined into an interior of the adhesive layer and are deformed by pressure in a joining process.

26. The stacked optical sheet module of claim 24, wherein upper end portions of the second unit light-condensing bodies are embedded and joined to an interior of the adhesive layer, and a shape of a cross-section locus of at least one of the second unit light-condensing bodies is deformed in a joining process.

27. The stacked optical sheet module of claim 24, wherein the adhesive layer has an uneven thickness, and upper end portions of the second unit light-condensing bodies are only partially embedded in the adhesive layer.

28. The stacked optical sheet module of claim 21, wherein the vertical distance from the lowest portion to the highest portion of at least one of the third unit light-condensing bodies is formed unevenly.

29. The stacked optical sheet module of claim 28, wherein ft the third unit light-condensing bodies each have cross-sections of sizes and shapes different from each other.

30. The stacked optical sheet module of claim 28, wherein a length of a cross-section trace of at least one of the third unit light-condensing bodies is formed asymmetrically.

31. The stacked optical sheet module of claim 21, wherein each of the third unit light-condensing bodies has a vertical angle same as each of the first unit light-condensing bodies.

32. The stacked optical sheet module of claim 21, wherein a trace of a cross-section of at least one of the first unit light-condensing bodies to the third unit light-condensing bodies is made up of a straight line.

33. The stacked optical sheet module of claim 21, wherein the inclined angle of the inclined surface of each of the third unit light-condensing bodies has an optimum value that can exhibit optimum optical characteristics corresponding to a material thereof.

* * * * *